July 14, 1970 C. W. BAUGH 3,520,225
HYDRAULIC DRIVE PIN RIVET
Original Filed Feb. 12, 1968
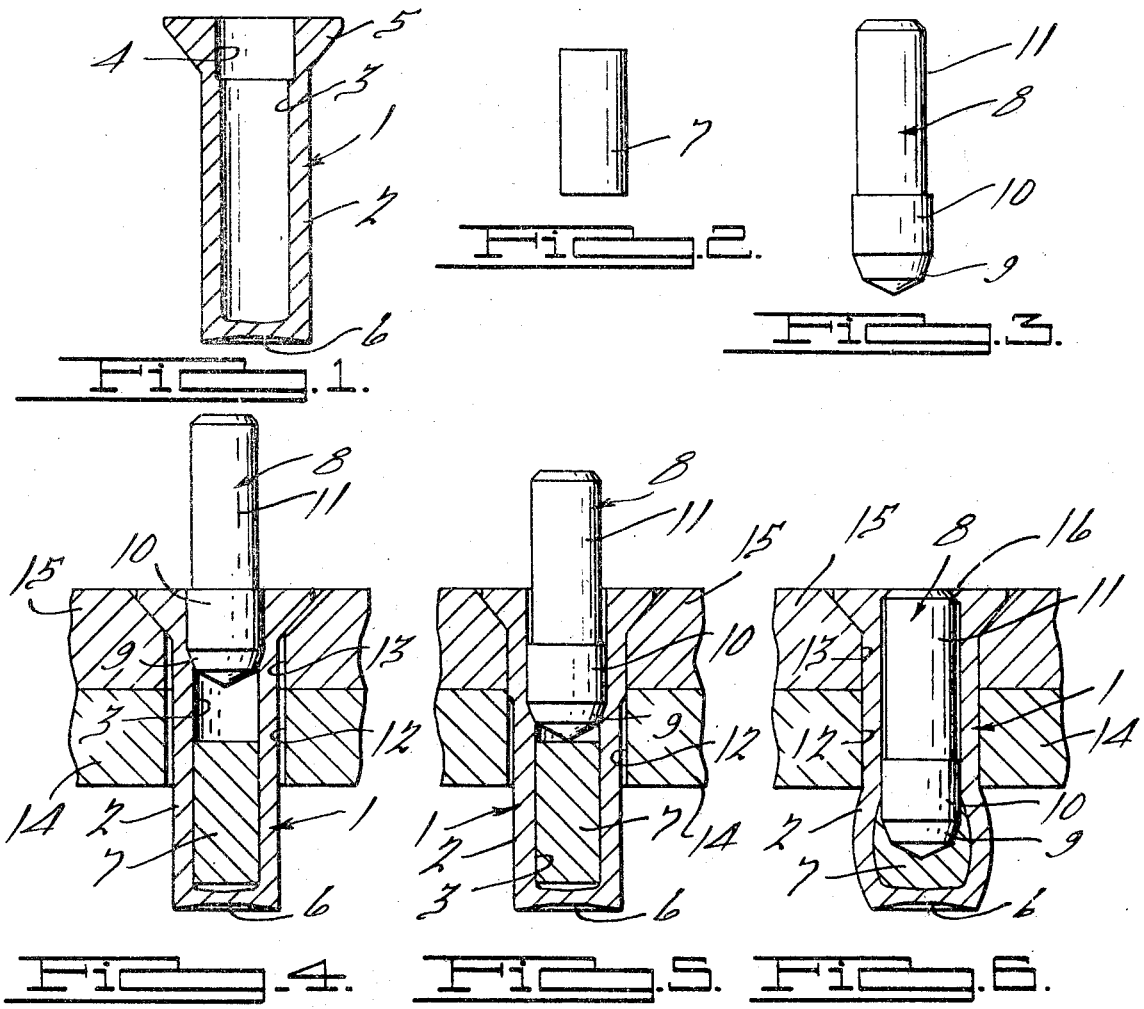
INVENTOR,
Charles W. Baugh
BY
Harness, Dickey & Pierce
ATTORNEYS.

United States Patent Office 3,520,225
Patented July 14, 1970

3,520,225
HYDRAULIC DRIVE PIN RIVET
Charles W. Baugh, St. Clair Shores, Mich., assignor to Huck Manufacturing Company
Continuation of application Ser. No. 704,831, Feb. 12, 1968. This application Aug. 4, 1969, Ser. No. 849,263
Int. Cl. F16b 13/04
U.S. Cl. 85—65       6 Claims

ABSTRACT OF THE DISCLOSURE

A blind drive pin rivet of the type in which the blind side is bulbed through the action of a fluid medium and in which means are provided to relieve excessive pressure so that the blind side is properly formed without disrupting the strength of the fastener and also with the pin so constructed that the fluid means cannot leak past the pin and the pin may be applied with satisfactory and relatively low force.

---

This application is a continuation of Ser. No. 704,831, filed Feb. 12, 1968, now abandoned.

The present invention relates to improvements in blind drive pin rivets. Such rivets are, generally speaking, well known in the prior art and comprise a hollow sleeve having one end open and the opposite end closed in which a solid cylindrical pin is slidably disposed. In certain of these known drive pin rivets, the blind side of the sleeve is bulbed by the interaction of special configurations of the closed end of the sleeve and the leading end of the pin. It is also known to cause the expanding of the blind side of the hollow rivet by incorporating a fluid material within the sleeve and causing such fluid material to exert hydraulic pressures against the blind side of the sleeve upon impact of the pin. It is particularly to this latter type of blind drive pin rivet that the present invention is directed. Representative prior art patents of this type of rivet are Lautmann 2,438,976, Varney et al. 2,492,605 and Lebert 2,562,724.

In blind rivets of this type it is necessary that the fluid material be confined within the sleeve so that it cannot leak past the pin during its movement in the sleeve upon impact, and also desirable that the impact force against the pin may be relatively low. Furthermore, if the pressures exerted by the fluid against the side walls are excessive, they will cause a blow out through the wall of the sleeve. If this blow out occurs in the wrong place, for example, immediately adjacent sheet line, the strength of the fastener is adversely affected. Therefore, according to the present invention, the closed end wall of the sleeve has at least a portion which is of less thickness than the side wall thickness of the sleeve so that the blow out will occur at the controlled point and the strength of the fastener unaffected.

The primary object of the present invention is to provide a drive pin fastener of the type in which the bulb is formed by fluid or hydraulic pressures against the wall of the sleeve adjacent the inner or leading end thereof and in which the strength of the fastener is maintained even though a blow out may be caused due to excessive pressure.

Another object of the invention is to provide a drive pin rivet of the type described in which the fluid material is retained against leakage during application of the pin and in which relatively low force need be applied to the pin.

In the drawings in which like numbers are used to designate like parts throughout:

FIG. 1 is a vertical cross-sectional view of a drive pin rivet sleeve of the present invention;

FIG. 2 is a side elevational view of a pellet of fluid material employed with the present invention;

FIG. 3 is a side elevational view of the drive pin of the present invention;

FIG. 4 is a cross-sectional view with parts in elevation of the drive pin assembly showing the drive pin in its initial position with respect to the parts being secured together;

FIG. 5 is a view similar to FIG. 4 showing the drive pin in its partially driven position;

FIG. 6 is a view similar to FIG. 5 showing the drive pin fully driven and the blind side formed.

Referring to the drawings, the drive pin rivet comprises a sleeve generally indicated at 1 which is generally in the form of a hollow cylinder, circular in cross section, having a relatively thin side wall 2 of substantially uniform thickness. The sleeve 1 has a central bore 3 provided with a slight counterbore 4 at the open end thereof. The open end of the sleeve 1 in the embodiment illustrated is in the form of a countersunk head 5. The opposite end of the sleeve 1 is closed by a transverse wall 6 and an important feature of the present invention is that the wall thickness of the closed end 6 is less than the wall thickness of the side wall 2, and therefore weaker than said side wall.

A pellet 7 of predetermined volume is provided and such pellet 7 may be formed of soft rubber, wax, very soft metal, or in some cases could be heavy oil. The pellet 7 is preferably substantially of the internal diameter of the bore 3 and is of such a length as to give it predetermined volume such as to properly bulb the sleeve.

A drive pin generally indicated at 8 is of cylindrical form and has a pointed and tapered end 9 at the leading end of the pin. The pin 8 has a longitudinally extending land 10 of predetermined length followed by a reduced section 11 which has a slightly reduced diameter as compared to the land section 10 so that the driving or impact pressure is relieved.

The elements at 7 and 8 are assembled as shown in FIG. 4 and are deposited within aligned openings 12 and 13 in panels 14 and 15 which are to be secured together. There is usually slight clearance between the O.D. of the sleeve, and the openings.

The land portion 10 of the pin 8 is received within the counterbore 4 preferably with a press fit and movement of the pin 8 into the sleeve causes an expansion of the sleeve within the openings 12 and 13 and consequently fills these holes.

The pin 8 is moved into the sleeve 1 to its final position and the leading end 9 of the pin projects into the fluid material 7 causing it to flow thereby exerting hydraulic pressures against the exposed wall portion 2 on the blind side of the sleeve 1 to thereby effect a bulbing action of the sleeve as shown in FIG. 6.

The land 10 is of such length that the fluid material 7 is sealed against escape and is also of such a length that this sealing is assured when the pin is in its final position as shown in FIG. 6.

The relief in section 11 assures that the pin may be applied with a relatively low impact force while the seal is maintained.

As a safety precaution, a controlled "blow out" section is provided so that in the event that excessive pressures against the side wall are developed due to the fluid or hydraulic force applied by the material 7, the blow out will occur through the reduced or weakened wall 6. Otherwise there is danger that the blow out may occur in the side wall 2; and it has been found that when such blow out does occur in the side walls 2, that it occurs immediately adjacent the sheet line so that the rupture in the side wall at this point reduces the strength of the fastener.

In the driven fastener when finally driven, the opening 4 adjacent the end of the pin at the point indicated at 16 will be peened over to assist in retaining the pin 8 in its fully driven position within the sleeve.

Formal changes and variations may be made in the various embodiments of the invention described without departing from the spirit and scope of the invention as set forth in the appended claims.

What is claimed is:

1. A blind drive pin rivet comprising an elongated cylindrical female member having an opening in one end thereof and having a relatively thin and substantially uniform side wall section, said member having an end wall closing the opposite end thereof, said end wall having at least a portion thereof thinner than said side wall section to provide a weakened relief escape, a cylindrical male member inserted in said opening and slidably disposed in said female member, a predetermined quantity of fluid material confined in said female member between said end section and the leading end of said male member and which is effective to expand the adjacent side wall section upon inward movement of said male member by the application of fluid pressure thereagainst, said male member having a surface sealing land slidably engaging the inside wall of said female member in sealing relationship therewith, said land having an axial length substantially less than that of said opening, said male member having a section following said sealing land of slightly smaller diameter to permit driving of said male member at relatively low pressure, said thinner end portion being adapted to "blow out" upon application of excessive pressure to permit escape of said fluid material.

2. The blind drive pin rivet according to claim 1 in which said sealing land has a diameter slightly larger than the diameter of said opening whereby said side wall section of said female member can be expanded radially outwardly by said sealing land upon inward movement of said male member.

3. A blind drive pin rivet comprising an elongated cylindrical female member having an opening in one end thereof and having its opposite end closed, and having a generally uniform bore portion extending between said opening and said closed end, a cylindrical male member inserted in said opening and slidably disposed in said bore of said female member, a predetermined quantity of fluid material confined in said female member between said closed end and the leading end of said male member and which is effective to expand the adjacent side wall section of said female member upon inward movement of said male member by the application of fluid pressure thereagainst, said male member having a surface sealing land slidably engaging said bore portion of said female member and having a preselected interference fit with said bore portion for radially outwardly expanding the side wall of said bore portion and for providing a good seal with said bore portion, said land having an axial length substantially less than that of said bore portion, said male member having a section following said sealing land of slightly smaller diameter to minimize friction and to permit driving of said male member at a relatively low force.

4. The blind drive pin rivet according to claim 3 in which said sealing land has a diameter slightly larger than the diameter of said opening whereby said side wall section of said female member can be expanded radially outwardly by said sealing land upon inward movement of said male member.

5. The blind drive pin rivet of claim 3 with said closed end having a wall portion thinner than the side wall section of said female member with said thinner wall portion being adapted to "blow out" upon application of excessive pressure to permit escape of said fluid material.

6. The blind drive pin rivet of claim 3 in a joint construction including a plurality of workpieces having aligned bores for receving said uniform bore portion of said female member with a preselected clearance prior to setting the rivet, said clearance being selected relative to said interference fit such that said side wall of said bore portion will be expanded into engagement with said aligned bores when the fastener is set.

References Cited

UNITED STATES PATENTS

| 2,492,590 | 12/1949 | Nofzinger | 85—65 |
| 2,562,724 | 7/1951 | Lebert | 85—65 |
| 2,849,201 | 8/1958 | Schelgunov | 85—82 |

FOREIGN PATENTS

| 601,988 | 2/1960 | Italy. |
| 737,480 | 7/1943 | Germany. |

MARION PARSONS, Jr., Primary Examiner

U.S. Cl. X.R.

85—77